United States Patent [19]

Tessler

[11] 4,119,487
[45] Oct. 10, 1978

[54] STARCH ETHER DERIVATIVES, A METHOD FOR THE PREPARATION THEREOF AND THEIR USE IN PAPER

[75] Inventor: Martin M. Tessler, Edison, N.J.

[73] Assignee: National Starch & Chemical Corporation, Bridgewater, N.J.

[21] Appl. No.: 830,422

[22] Filed: Sep. 6, 1977

[51] Int. Cl.² .............................................. D21H 3/28
[52] U.S. Cl. ..................................... 162/175; 536/49; 536/50; 536/108; 536/111
[58] Field of Search ................ 162/175; 536/108, 111, 536/49, 50; 260/513 R

[56] References Cited

U.S. PATENT DOCUMENTS

| 2,895,987 | 7/1959 | Hendry | 260/513 R |
|---|---|---|---|
| 2,989,520 | 6/1961 | Rutenberg et al. | 536/50 |
| 3,467,647 | 9/1969 | Benninga | 162/175 |

Primary Examiner—S. Leon Bashore
Assistant Examiner—William F. Smith
Attorney, Agent, or Firm—Edwin Szala; Ellen T. Dec

[57] ABSTRACT

Novel starch ether derivatives are prepared by reacting starch with 3-chloro-2-sulfopropionic acid. The resulting 2-sulfo-2-carboxyethyl starch ether derivatives find use in many applications, but are particularly useful as pigment retention aids in papermaking processes.

24 Claims, No Drawings

STARCH ETHER DERIVATIVES, A METHOD FOR THE PREPARATION THEREOF AND THEIR USE IN PAPER

BACKGROUND OF THE INVENTION

This invention relates to novel starch ether derivatives and to a method for the preparation thereof. This invention also relates to the use of the novel anionic or amphoteric starch ether derivatives as pigment retention aids in papermaking processes.

As used herein, the term "amphoteric starch ether derivative" refers to a starch ether derivative containing both cationic and anionic substituent groups.

The term "paper" as used herein includes sheet-like masses and molded products made from fibrous cellulosic materials which may be derived from natural sources as well as from synthetics such as polyamides, polyesters, and polyacrylic resins, and from mineral fibers such as asbestos and glass. In addition, papers made from combinations of cellulosic and synthetic materials are applicable herein. Paperboard is also included within the broad term "paper".

It is well known in the art to add anionic substituent groups to starch to form anionic and amphoteric starch ester and ether derivatives. Typical of the anionic substituent groups found in starch derivatives of the prior art are carboxyalkyl groups, sulfoalkyl groups, phosphate groups, and the like. A discussion of various starch ether derivatives containing these and other anionic groups can be found in "Starch: Chemistry and Technology", Vol. II, ed. by R. L. Whistler and E. F. Paschall (New York: Academic Press, 1967), pages 312-326. Among the reagents used to prepare carboxyalkyl starch ether derivatives are included sodium chloroacetate and salts of 1-halocarboxylic acids such as sodium 1-chloropropionate (see U.S. Pat. No. 2,523,709), sodium 1-bromopropionate, and sodium 1-bromoisovalerate (see German Pat. No. 717,275). Typical reagents used to prepared sulfoalkyl starch ether derivatives are sodium haloalkyl sulfonates such as, for example, sodium 2-haloethyl sulfonates (see U.S. Pat. Nos. 2,883,375 and 2,802,000), and sodium 3-chloro-2-hydroxypropyl sulfonate (see U.S. Pat. Nos. 2,825,727 and 2,806,857).

Sulfocarboxyalkyl starch ester derivatives are also known from the prior art, e.g., U.S. Pat. No. 4,029,544 to Jarowenko et al. teaches a pigment retention aid comprising an amphoteric starch ester derivative containing sulfosuccinate groups and cationogenic or cationic nitrogen-containing groups. Starch derivatives containing sulfocarboxyalkyl ether substituents, however, have not yet been disclosed.

Pigment retention aids per se are also well known in the art. In the case of paper containing added pigments, these materials are added to the pulp or stock during the papermaking process for the specific purpose of retaining a greater proportion of such pigments in the paper (rather than have them drain off in the water that is removed during the formation of the sheet). A particularly desirable pigment retention aid in paper is one which is effective at the higher alum concentrations often found in the paper industry, particularly in connection with the increasing utilization of recycled water.

It has been proposed to use starch phosphates as pigment retention aids, and their effectiveness has been noticeable with paper stock containing low to moderate concentrations of alum. At higher alum concentrations, however, the effectiveness of starch phosphates declines, due to reasons not readily understood. Possibly this is because the phosphate groups function as weak acids which are incapable of providing desired pigment retention in the presence of alum concentrations of greater than 4 percent, by weight, or the dry pulp. Thus, starch phosphates, or di- and trialkyl aminoalkyl starch phosphates, like other anionic or amphoteric starch derivatives of the prior art which are effective at lower concentrations of alum, are inferior at higher alum concentrations.

The amphoteric sulfocarboxyalkyl starch ester derivatives of Jarowenko et al. mentioned hereinabove have been found to improve the pigment retention of paper containing alum concentrations above 4 percent by weight, of the dry pulp. The preparation of the starch derivatives of Jarowenko et al., however, typically involves a somewhat laborious and uneconomical procedure whereby the starch base, which ordinarily must first be acid-converted to a water fluidity of at least 4 and not more than 40, is reacted with a reagent which provides the cationic substituent groups, then esterified with maleic anhydride, and finally sulfonated with sodium metabisulfite. Hence, the search continues for other starch derivatives which will improve pigment retention in paper at high concentrations of alum while being at the same time relatively facile and inexpensive to prepare.

Accordingly, it is an object of the present invention to provide novel anionic and amphoteric starch ether derivatives.

It is another object to provide anionic sulfocarboxyalkyl ether substituents for starch which substituents are relatively stable in alkaline medium.

It is a further object to provide a method for preparing starch ether derivatives which is both economical and convenient.

It is a still further object to provide anionic and amphoteric starch ether derivatives which act efficiently as pigment retention aids in paper having high alum acidity.

SUMMARY OF THE INVENTION

The above and related objects are achieved in the preparation of a novel starch ether derivative of the general structure:

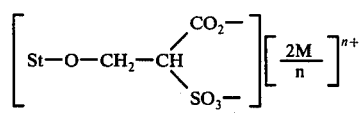

wherein St—O— represents a starch molecule (wherein the hydrogen of a hydroxyl group of an anhydroglucose unit has been replaced as shown), M is a cation, preferably an alkali or alkaline earth metal, and $n$ is the valence number of M.

In the method of this invention the starch ether derivative is prepared by reacting a starch base with about 0.5-100% by weight of neutralized 3-chloro-2-sulfopropionic acid reagent, based on dry starch, and isolating the resultant starch derivative. The reaction may be carried out in aqueous, non-aqueous or substantially dry reaction medium.

In one embodiment of this method, the reaction is carried out in aqueous medium at a pH of 9.5-13.0 and at a temperature of 20°-90° C. for 0.5-24 hours.

In another embodiment, the reaction is carried out in non-aqueous medium, and preferably in an organic solvent such as an alcohol or an aromatic or aliphatic hydrocarbon, at a temperature of 40°-150° C. for 1-20 hours. The reaction can also be carried out in aqueous alcohols if desired.

In a third embodiment, the reaction is carried out in a substantially dry reaction medium at a temperature of 30°-150° C. for 0.5-10 hours.

The starch ether derivatives of this invention may be anionic or amphoteric in character, and when amphoteric, will contain cationogenic or cationic nitrogen-containing groups as well as the novel anionic substituent groups provided herein by the neutralized 3-chloro-2-sulfopropionic acid reagent.

Because of their ether linkages the anionic ether substituents of the derivatives herein are relatively stable in alkaline medium as compared to the corresponding ester substituents of the starch derivatives of Jarowenko et al. Furthermore, the method for preparing the starch derivatives herein has distinct advantages in that the anionic substituents are introduced into the starch base in one convenient step utilizing only one reagent which is both inexpensive and readily prepared. In addition, the starch bases used herein are not limited to a certain range of water fluidity.

The novel anionic and amphoteric starch ether derivatives of the present invention show improved pigment retention in paper containing high levels of alum. The granular anionic starch ether derivatives used as pigment retention aids in paper containing pigment and alum are preferably prepared using 1-15% by weight of neutralized 3-chloro-2-sulfopropionic acid reagent, while the granular amphoteric derivatives are preferably prepared using 2-6% by weight of anionic reagent and 0.5-2.5% by weight of cationic reagent, with the ratio of anionic to cationic reagent being about 2:1 to 4:1 by weight, wherein the cationic reagent provides the cationogenic or cationic nitrogen-containing substituent groups.

DESCRIPTION OF THE PREFERRED EMBODIMENTS

The applicable starch bases which may be used in preparing the novel starch ether derivatives herein may be derived from any plant source including corn, potato, sweet potato, wheat, rice, sago, tapioca, waxy maize, sorghum, high amylose corn, or the like. Also included are conversion products derived from any of the latter bases including, for example, dextrins prepared by the hydrolytic action of acid and/or heat; oxidized starches prepared by treatment with oxidants such as sodium hypochlorite; fluidity or thin-boiling starches prepared, for example, by enzyme conversion or mild acid hydrolysis; and derivatized starches such as ethers and esters. If the desired starch blend is to be a granular starch, then obviously the initial starting material must be in granular form. It is to be noted that the products of this invention may also be prepared employing gelatinized starches, i.e., non-granular starches.

The cationic starches (i.e., starches having cationogenic or cationic nitrogen-containing groups) which may be used to prepare the amphoteric starch ether derivatives of this invention are starch derivatives which are prepared, for example, by reacting starch through an etherification or esterification reaction with any reagent which will introduce a cationic group containing nitrogen, sulfur or phosphorus therein. Examples of such groups are the amine (primary, secondary, tertiary, or quaternary), sulfonium and phosphonium groups.

The 3-chloro-2-sulfopropionic acid, which, in neutralized form, reacts with starch to provide the 2-sulfo-2-carboxyethyl ether substituents therein, may itself be prepared by procedures well known and described in the literature. It is most conveniently prepared by reacting chlorosulfonic acid with acrylic acid as disclosed in U.S. Pat. No. 2,895,987 and *Bull. Soc. Chim. Fr.* (7-8), Part 2, 2266 (1973). The latter publication also describes another method for preparing 3-chloro-2-sulfopropionic acid wherein 3-chloropropionic acid is reacted with sulfur trioxide.

In the method for preparing the novel starch ether derivatives herein, the 3-chloro-2-sulfopropionic acid reagent must be neutralized before reaction with starch. There are various modifications of the neutralization procedure, depending upon the reaction medium used, the nature of the starch, the amount of reagent used, etc. In one modification, the reagent is neutralized prior to being mixed with starch by adding an aqueous solution of sodium hydroxide, or any other common alkali metal base including potassium hydroxide, lithium hydroxide, sodium and potassium carbonate, and the like, to the reagent in water. The resulting aqueous reagent solution may then be mixed directly with starch, or, alternatively, the neutralized reagent solution may be evaporated to dryness and used in the dry form. In another modification of the neutralization procedure, the 3-chloro-2-sulfopropionic acid reagent is neutralized in situ in a starch slurry using any common alkali or alkaline earth base. When granular starches are employed in the reaction, this latter method is particularly preferred, using lime (calcium hydroxide) as the neutralizing base. When non-granular starches are employed, either lime or aqueous sodium hydroxide (about 20-40% by weight) solution is preferred as the neutralizing base.

The exact structure of the neutralized 3-chloro-2-suflopropionic acid reagent which reacts with the starch base is not known with certainty. One proposal is that the starch reacts directly with the salt of 3-chloro-2-sulfopropionic acid to give the novel ether derivative of this invention as represented by the equation below:

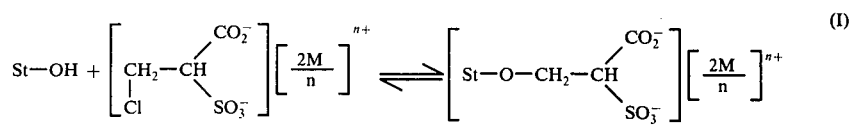

(I)

However, nuclear magnetic resonance data indicate that neutralization of 3-chloro-2-sulfopropionic acid with aqueous sodium hydroxide solution results in the formation of substantial amounts of sodium α-sulfoacrylate. Thus, an α-sulfoacrylate salt may instead be the actual reagent which reacts with starch according to the following equation:

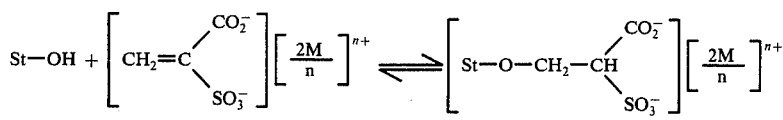

Nonetheless, in both cases, the structures of the resulting starch derivatives are identical and the invention is not intended to be limited to any specific reaction mechanism.

The practitioner will recognize that the starch molecule is a polymer which contains many anhydroglucose units, each having three free hydroxyl groups (except the non-reducing end glucose units which contain four free hydroxyl groups) which may react with the neutralized 3-chloro-2-sulfopropionic acid reagent. Thus, the number of such displacements or the degree of substitution (D.S.) will vary with the particular starch, the ratio of reagent to starch and, to some extent, the reaction conditions. Furthermore, since it is known that the relative reactivity of each of the hydroxyl groups within the anhydroglucose unit is not equivalent, it is probable that some will be more reactive with the reagent than others.

The amount of neutralized 3-chloro-2-sulfopropionic acid reagent to be employed in the reaction with starch herein will vary from about 0.5–100% by weight, based on the weight of dry starch, depending on such factors as the starch base used and the degree of substitution required in the end product. In general, the preferred amount of reagent to be used is 1–15% by weight.

In the method of this invention the reaction may be carried out in aqueous, non-aqueous or substantially dry reaction medium. In aqueous medium, the temperature at which the reaction is carried out will vary from 20° to 90° C. for non-granular starches and from 20° to 55° C. for granular starches. It will be recognized by the practitioner that use of temperatures above about 60° C. with granular starches in aqueous medium will result in granule swelling and filtration difficulties or gelatinization of the starch. Nevertheless, despite the type of starch used, it is preferred to employ reaction temperatures in aqueous medium of 20°–30° C. because the reaction is at all times in a state of equilibrium and temperatures above 30° C. favor the reverse reaction, resulting in starch derivatives containing fewer anionic ether substituents.

The pH of the reaction mixture in aqueous medium may range from 9.5–13.0, with the preferred pH range being 11–12. The pH is conveniently controlled by the periodic addition of dilute aqueous sodium hydroxide or other common bases including potassium hydroxide, sodium or potassium carbonate, magnesium hydroxide, calcium hydroxide, and the like. Alternatively, the pH is not controlled, but rather an excess of the base is added initially to maintain the required alkaline pH.

When conducting the reaction in aqueous medium using alkali metal bases to neutralize the reagent, it is preferred, particularly when granular starches are employed, to carry out the reaction in the presence of sodium sulfate in amounts of from about 15–50% by weight of dry starch. The presence of sodium sulfate acts to suppress swelling of the starch and gives a more filterable product.

Upon contact of the neutralized 3-chloro-2-sulfopropionic acid reagent with starch, the reaction mixture is agitated under the desired reaction conditions. Reaction time in aqueous medium will vary from about 0.5 to 24 hours, depending on such factors as the amount of reagent employed, the temperature, the pH, the scale of the reaction, etc. It is to be understood that at reaction temperatures of 20°–30° C. in aqueous medium, the nature and degree of substitution of the resulting starch ether derivative will not be affected significantly by variations in reaction time. However, as the temperature increases above 30° C., the degree of anionic ether substitution in the product will decrease in proportion to the temperature and duration of the reaction. To obtain reasonable substitution in the product at higher temperatures, the reaction time should be shortened accordingly. In general, the preferred range of reaction times in aqueous medium is 1–6 hours. After completion of the reaction, the pH of the reaction mixture is preferably adjusted to a value of from 3.0 to 7.0 with any common acid such as hydrochloric acid, sulfuric acid, acetic acid, and the like, which acid may be conveniently added as a dilute aqueous solution.

Recovery of the resulting starch product may be readily accomplished, with the particular method employed being dependent on the form of the starch base. Thus, a granular starch is recovered by filtration, washed with water to remove any residual salts, and dried. The washed granular starch products may be drum-dried, or spray-dried, or gelatinized and isolated by alcohol precipitation or freeze drying. If the starch product is non-granular, it can be purified by dialysis to remove residual salts and isolated by alcohol precipitation, freeze drying, or spray drying.

While an aqueous medium is preferred, it is also possible to carry out the reaction, if desired, in a non-aqueous medium. In this procedure, neutralized reagent which has been dried as previously described is added to a slurry of the starch base in a common organic solvent such as, for example, an alcohol, or an aromatic or aliphatic hydrocarbon. Examples of suitable solvents herein are ethanol, heptane, iso-propanol, butanol, toluene, and the like. The reaction in non-aqueous medium is carried out at a temperature of about 40°–150° C. for 1–20 hours, followed by isolation of the starch product.

If desired, the novel starch ether derivatives of this invention may also be prepared in a substantially dry reaction medium. In one variation of this method, the alkali metal salt of 3-chloro-2-sulfopropionic acid is added in dry form to a slurry of the starch base in water. The pH of the resulting mixture is adjusted to between 9.5 and 12 using any of the common bases described hereinabove. The mixture is stirred and the thusly-treated starch recovered from the slurry by filtration. The resultant starch is thereafter heated (as by placing in an oven) at temperatures of about 30° to 150° C., preferably 40°–80° C. The reaction period, i.e., heating time, will vary according to the reaction temperature and selected starch base employed. Generally, lower temperatures will require longer reaction times. Reaction periods of about 0.5 to 10 hours have been found to be sufficient in most instances. At the end of the reaction period the starch product is allowed to cool. If removal of any residual salts is desired, the starch is then suspended in water, the suspension pH adjusted to about 3–7 using a common acid, and the resultant starch ether derivative recovered from the suspension by filtration, washing and isolation.

In another variation of the substantially dry reaction, the 3-chloro-2-sulfopropionic acid reagent is neutralized in situ by alternately adding reagent and lime in small amounts to a slurry of the starch in water while the pH is maintained between 9.5 and 12. After addition is complete, the thusly-treated starch is recovered and dried and the reaction conducted as described hereinabove.

A third variation of the substantially dry reaction involves spraying a neutralized aqueous solution of 3-chloro-2-sulfopropionic acid reagent onto a substantially dry starch and heating the thusly-treated starch as described above. It is preferred in this latter procedure to use solutions of alkali metal salts of 3-chloro-2-sulfopropionic acid as reagent.

In addition to preparing anionic starch ether derivatives, it is also within the scope of this invention to prepare amphoteric starch ether derivatives which contain, in addition to the novel anionic substituent groups described hereinabove, cationogenic or cationic nitrogen-containing groups comprising primary, secondary, tertiary and quaternary amines and sulfonium and phosphonium groups attached to the starch through either ether or ester linkages. For purposes of this invention, tertiary amino and quaternary ammonium ether groups are preferred. The general method for preparing starches containing tertiary amino groups, which method typically involves reacting starch under alkaline conditions with a dialkylaminoalkyl halide, is described in U.S. Pat. No. 2,813,093. Another method therefor is disclosed in U.S. Pat. No. 3,674,725. The primary and secondary amine starches may be prepared by reacting starch with aminoalkyl anhydrides, aminoalkyl epoxides or halides, or the corresponding compounds containing aryl in addition to alkyl groups.

It is known that quaternary ammonium groups may be introduced into the starch molecule by suitable treatment of the tertiary aminoalkyl ether of starch, as described, for example, in U.S. Pat. No. 2,813,093. Alternatively, quaternary groups may be introduced directly into the starch molecule by treatment with the reaction product of an epihalohydrin and a tertiary amine or tertiary amine salt, for example, to provide 3-(trimethylammonium chloride)-2-hydroxypropyl ether substituent groups. In either case, the resulting starch is cationic in character and is suitable for use in the novel method of this invention for preparing amphoteric starch ether derivatives.

The general preparation of sulfonium derivatives is described in U.S. Pat. No. 2,989,520 and involves essentially the reaction of starch in an aqueous alkaline medium with a beta-halogenoalkylsulfonium salt, vinylsulfonium salt or epoxyalkylsulfonium salt. The general preparation of phosphonium starch derivatives is disclosed in U.S. Pat. No. 3,077,469 and involves essentially reaction of starch in an aqueous alkaline medium with a beta-halogenoalkylphosphonium salt. Other suitable cationic starches and cationic reagents which provide cationogenic or cationic nitrogen-containing groups in starches will be apparent to the practitioner, since the amphoteric starch ether derivatives of the present invention comprise any starch treated with neutralized 3-chloro-2-sulfopropionic acid reagent which starch has been rendered cationic by the introduction of an electrically positively-charged moiety into the starch molecule.

There are three possible ways to prepare the amphoteric starch ether derivatives in accordance with this invention: (1) a cationic starch derivative is reacted with neutralized 3-chloro-2-sulfopropionic acid reagent, (2) an anionic starch ether derivative of this invention is reacted with a cationic reagent (or reagents) providing the cationogenic or cationic nitrogen-containing groups therein, or (3) a starch base is reacted in one step with both neutralized 3-chloro-2-sulfopropionic acid reagent and the cationic reagent(s).

Where a cationic or anionic starch is reacted with neutralized 3-chloro-2-sulfopropionic acid reagent or cationic reagent(s), respectively, to form the amphoteric starch ether derivative in a two-step procedure, the methods for preparing simple anionic or cationic starch derivatives are followed. The skilled practitioner will recognize that starch esters are not very stable at high pH and, hence, amphoteric derivatives containing cationic esters must be prepared by method (2) to avoid ester hydrolysis under the alkaline conditions required to prepare the anionic starch ether derivatives of this invention.

In the one-step method for preparing amphoteric starch ether derivatives, one variation involves slurrying the starch in water and then slowly adding 3-chloro-2-sulfopropionic acid thereto, while controlling the pH at 9–12 with lime. When reagent addition is complete and the pH constant, additional lime is added, followed by the desired amount of cationic reagent, or sequence of cationic reagents if more than one reagent is employed. The resulting starch mixture is agitated at 20°–45° C. for 6–24 hours. After reaction is complete, the pH is adjusted to about 3 using dilute hydrochloric acid solution and the product recovered as in the procedure for preparing the anionic starch ether derivative in aqueous medium presented hereinabove.

The alternative procedure for preparing the amphoteric derivatives in one step involves suspending the starch base in water and adding lime thereto, followed by addition of the cationic reagent. The resulting starch slurry is agitated and then 3-chloro-2-sulfopropionic acid slowly added while the pH is controlled by periodically adding more lime as required. The reaction is then allowed to proceed and the product recovered as above described.

It can be appreciated by the practitioner that a large number of variations may be effected in reacting the starch base with neutralized 3-chloro-2-sulfopropionic acid reagent in accordance with the reaction procedures described above for preparing anionic and amphoteric starch ether derivatives without materially departing from the scope and spirit of the invention. Such variations will be evident to those skilled in the art and are to be included within the scope of this invention.

The novel 2-sulfo-2-carboxyethyl ether substituents contained in the starch derivatives herein are more stable in alkaline medium than their corresponding ester counterparts. However, as mentioned hereinabove, at a given temperature above about 30° C., the starch derivatives of this invention exhibit a gradual loss in content of anionic ether substituent groups with increasing time.

The anionic and amphoteric starch ether derivatives of this invention may be used as wet end additives and in many other applications wherein such derivatives are commonly used such as in coatings, sizes, oven cleaners, textile printing, and the like. The novel starch derivatives herein are particularly useful as pigment retention aids in the manufacture of paper containing pigment and alum. Both the anionic and amphoteric starch ether derivatives herein show excellent pigment retention in paper containing high amounts of alum (low pH).

The pigment retention of these novel starch ether derivatives in the presence of alum, and especially at alum concentrations higher than about 4%, is affected by the quantity of 2-sulfo-2-carboxyethyl ether substituents chemically bound to the starch molecule. Although the anionic starch ether derivative prepared by reacting very small amounts of neutralized 3-chloro-2-sulfopropionic acid reagent with starch to provide such substituent groups therein will demonstrate some improvement in pigment retention, the preferred amount of such reagent to be employed in preparing the anionic granular starch derivatives is 1-5% by weight, based on the weight of dry starch. Higher amounts of reagent will be used, but will not significantly increase the pigment retention properties of the starch derivatives and may cause swelling and filtration problems during manufacture of the starch derivatives.

For the amphoteric starch ether derivatives, the ratio of anionic to cationogenic or cationic groups will vary depending on the reagent reaction efficiency, which is in turn dependent on the temperature, pH and reaction time. Although higher amounts of anionic and cationic reagents may be used, the preferred granular amphoteric starch derivatives to be employed as pigment retention aids herein are those prepared by reacting granular starch with 2-6% by weight of neutralized 3-chloro-2-sulfopropionic acid reagent and 0.5-2.5% by weight of cationic reagent, such that a ratio of anionic to cationic reagent of about 2:1 to 4:1 by weight is achieved.

The starch derivatives described herein are used in their dispersed (i.e., cooked) form mainly as beater additives, although their addition to the pulp may occur at any point in the paper-making process prior to the ultimate conversion of the wet pulp into a dry web or sheet. Thus, for example, they may be added to the pulp while the latter is in the headbox, beater, hydropulper or stock chest.

The pigment retention aids of this invention may be effectively used for addition to pulp prepared from any types of cellulosic fibers, synthetic fibers, or combinations thereof. Among the cellulosic materials which may be used are bleached and unbleached sulfate, (kraft), bleached and unbleached sulfite, bleached and unbleached soda, neutral sulfite, semi-chemical chemiground wood, ground wood or any combination of these fibers. Fibers of the viscous rayon or regenerated cellulose type may also be used if desired.

Any desired inert mineral fillers may be added to the pulp which is to be modified with the starch ether derivatives herein. Such materials include clay, titanium dioxide, talc, calcium carbonate, calcium sulfate and diatomaceous earths. Rosin or synthetic internal size may also be present, if desired.

The proportion of the starch derivative to be incorporated into the paper pulp may vary in accordance with the particular pulp involved. In general, it is preferred to use about 0.05 to 2.0% of the starch ether derivative, based on the dry weight of the pulp. Within this preferred range the precise amount which is used will depend upon the type of pulp being used, the specific operating conditions, and the particular end use for which the paper is intended. The use of amounts of starch derivative greater than 2%, on the dry weight of the pulp, is not precluded, but is ordinarily unnecessary in order to achieve the desired improvements. When added in the proper concentrations, the starch ether derivatives herein serve to increase pigment retention while maintaining the resistance of the finished sheet to folding, picking and scuffing.

The following examples will more fully illustrate the embodiments of this invention. In the examples, all parts and percentages are given by weight and all temperatures in degrees Celsius unless otherwise noted.

The following general test procedure is used throughout the examples to determine the percentage of 2-sulfo-2-carboxyethyl ether substituents present in the final starch derivative.

A total of 5.000 g. of starch product is slurried in 10 ml. of distilled water and 25 ml. of a 0.1 N hydrochloric acid solution then added. The starch slurry is agitated for 30 minutes, filtered, and washed with distilled water until the starch is free of chloride ion as determined by the silver nitrate test. The starch is then quantitatively transferred to a large beaker and 100 ml. of distilled water added, followed by 200 ml. of hot distilled water. The resultant mixture is then heated with agitation in a boiling water bath for 10 minutes, after which it is removed from the bath and titrated while still hot with 0.1 N sodium hydroxide solution to a phenolphthalein pink endpoint. If the starch product filters very slowly while being washed with water to remove the chloride ion, one of two other methods of purification of the starch product is employed. In one method, mixtures of aqueous ethanol are used to remove the chloride ion from the starch. In the second method, the starch slurry is centrifuged and the water removed therefrom by decanting rather than by filtration.

EXAMPLE I

This example illustrates the preparation of 3-chloro-2-sulfopropionic acid and its use in the preparation of the novel anionic starch ether derivatives of this invention in aqueous medium.

I. Preparation of 3-Chloro-2-Sulfopropionic Acid

A total of 148 parts acrylic acid was placed in a flask and cooled to about 5° C. Then 260 parts chlorosulfonic acid was added dropwise to the flask with agitation and cooling to maintain the temperature between 0° and 10° C. After addition was complete, the temperature was slowly raised over a period of several hours to 80° C. and the reaction mixture agitated at 80° C. for 16 hours. After reaction was complete, the product was cooled to room temperature and used (after neutralization) without additional purification in subsequent starch reactions. The yield of product was 363 parts of a viscous, dark red-brown fluid.

II. Starch Reactions

Method A: A total of 5 parts 3-chloro-2-sulfopropionic acid was added to 62.5 parts water and the pH raised to 11.0 with 50% aqueous sodium hydroxide solution. The temperature was maintained below 20° C. throughout the addition. When the pH became constant (i.e., all of the reagent was neutralized to the disodium salt), a total of 1.5 parts sodium hydroxide and 15.0 parts sodium sulfate were dissolved in the solution. Then 50 parts corn starch was added and the resulting mixture agitated at room temperature (about 24° C.) for 24 hours. The pH was then lowered from 11.0 to 6.0 with 9.5% aqueous hydrochloric acid and the starch product recovered by filtration, washed three times with water, and dried. The resultant starch ether derivative was found to contain 1.6% 2-sulfo-2-carboxyethyl ether substituents.

Method B. A total of 8.0 parts 3-chloro-2-sulfopropionic acid was slowly added to 7.8 parts water while controlling the pH between about 7-9 by periodically adding 50% aqueous sodium hydroxide solution as required. During the addition the temperature was maintained below 30° C. by cooling. The total amount of sodium hydroxide required to maintain the pH was 10.1 parts. After addition was complete, the final pH of the resulting neutralized 3-chloro-2-sulfopropionic acid reagent solution was 8.0.

A total of 200 parts corn starch was slurried in 250 parts water and then 60 parts sodium sulfate and 55 parts of a 3% aqueous sodium hydroxide solution were added thereto. The aqueous neutralized 3-chloro-2-sulfopropionic acid reagent solution prepared above was then added to the starch slurry and the resulting mixture agitated at 40° C. for 16 hours, after which the reaction mixture was cooled to about 25° C. and the pH lowered to 6.0 with 9.5% aqueous hydrochloric acid solution. The starch product was recovered by filtration, washed three times by resuspension in water, and dried. The resultant starch ether derivative was found to contain 0.81% 2-sulfo-2-carboxyethyl ether substituents.

Method C: A total of 200 parts corn starch was slurried in 250 parts water and 2.0 parts lime (calcium hydroxide) added thereto. Then 16.0 parts 3-chloro-2-sulfopropionic acid was slowly added while controlling the pH at 11.1–11.2 by periodically adding additional lime as required. A total of 14.9 parts lime was required to control the pH. After addition of 3-chloro-2-sulfopropionic acid reagent was complete and the pH constant, the resultant starch slurry was agitated at room temperature for 18 hours. The pH was then lowered to 3.0 with 9.5% aqueous hydrochloric acid solution and the starch product recovered by filtration, washed with water, and dried. The pH of the starch slurry was raised to 5.0 with 3% aqueous sodium hydroxide solution after the washing step but before drying. The resultant starch ether derivative was found to contain 1.52% 2-sulfo-2-carboxyethyl ether substituents.

EXAMPLE II

This example illustrates the preparation of additional anionic starch ether derivatives of this invention employing varied reaction conditions.

In preparing the anionic starch ether derivatives designated as Nos. 1–12 in Table I, the basic procedure which was followed comprised reacting the indicated starch by method A, B or C of Example I at the indicated temperature and for the given reaction time. The starch products were analyzed for 2-sulfo-2-carboxyethyl ether substituents and the results summarized in Table I.

TABLE I

| Derivative No. | Starch Base | Reaction Method | % Reagent by weight based on starch | Reaction Temperature (° C.) | Reaction Time (hours) | % 2-Sulfo-2-carboxyethyl Ether Substituents |
|---|---|---|---|---|---|---|
| 1 | corn | A | 10.0 | 50 | 2 | 1.35 |
| 2 | corn | A | 10.0 | 50 | 5 | 1.26 |
| 3 | corn | A | 10.0 | 50 | 8 | 1.61 |
| 4 | corn | A | 10.0 | 50 | 16 | 1.15 |
| 5 | corn | A | 10.0 | 30 | 16 | 2.11 |
| 6 | corn | A | 2.0 | 50 | 16 | 0.33 |
| 7 | Waxy maize previously treated with 7.0% propylene oxide and 0.02% epichlorohydrin | A | 10.0 | 45 | 16 | 0.95 |
| 8 | Tapioca | A | 10.0 | 45 | 16 | 1.00 |
| 9 | Corn starch (oxidized by reaction with NaOCl to 50 fluidity) | A | 10.0 | 45 | 16 | 1.57 |
| 10 | corn | A* | 10.2 | 45 | 16 | 1.75 |
| 11 | corn | C | 8.0 | 23 | 18 | 1.52 |
| 12 | Waxy maize (acid-converted to 50 fluidity) | B | 4.0 | 40 | 16 | 0.73 |

*Method A except that potassium hydroxide was employed instead of sodium hydroxide.

EXAMPLE III

This example illustrates the preparation of additional anionic starch ether derivatives of this invention employing varied reaction pH wherein the pH of the reaction medium is controlled during the reaction.

The anionic starch ether derivatives designated as Nos. 13–15 in Table II were prepared as follows.

A total of 4 parts 3-chloro-2-sulfopropionic acid was slowly added to 20 parts water with agitation. The temperature was maintained below 30° C. by cooling with an ice bath and the pH maintained at 8.0 by periodically adding 50% aqueous sodium hydroxide solution as required. When the pH became constant, the resulting aqueous solution of neutralized reagent was added to a slurry of 100 parts corn starch in 125 parts water which had been previously adjusted to the desired reaction pH. The pH was maintained constant by periodically adding 3% aqueous sodium hydroxide solution as required and the starch slurry agitated at 40° C. for 17 hours. The pH was then lowered to 3.0 and the starch product recovered by filtration, washed three times with water, and dried. The resultant anionic starch ether derivatives were then analyzed for 2-sulfo-2-carboxyethyl ether substituents and the results summarized in Table II:

TABLE II

| Derivative No. | Controlled Reaction pH | % 2-Sulfo-2-carboxyethyl Ether Substituents |
|---|---|---|
| 13 | 9.5 | 0.29 |
| 14 | 10.7 | 0.56 |
| 15 | 11.2 | 1.24 |

EXAMPLE IV

This example illustrates the preparation of the novel anionic starch ether derivatives of this invention in aqueous medium using dry reagent.

A total of 20.8 parts 3-chloro-2-sulfopropionic acid was slowly added to 62.7 parts water while controlling the pH at 8.0 with 50% aqueous sodium hydroxide solution and cooling to maintain the temperature below 20° C. When the pH remained constant, the aqueous neutralized reagent solution was evaporated to dryness at 30° C. under reduced pressure (water aspirator) using a rotary evaporator.

A total of 5.0 parts dry neutralized reagent prepared above was added to a solution of 1.5 parts sodium hydroxide and 15 parts sodium sulfate in 62.5 parts water. Then 50.0 parts corn starch was added and the resulting mixture agitated for 16 hours at 40° C. At the end of the reaction the pH was lowered from 12.2 to 6.0 with 10% aqueous hydrochloric acid solution and the starch product recovered by filtration, washed three times with water, and dried. The resultant anionic starch ether derivative was found to contain 0.68% 2-sulfo-2-carboxyethyl ether substituents.

EXAMPLE V

This example illustrates the preparation of two anionic starch ether derivatives in aqueous medium at two different temperatures using a previously gelatinized starch base.

I. A total of 20 parts waxy maize starch which had been acid-converted to a degree known in the trade as 85 fluidity was added to 60 parts water and the suspension cooked in a boiling water bath for 10 minutes. The resulting gelatinized starch dispersion was cooled to 45° C. and the pH raised to 11.4. Then a neutralized reagent solution consisting of 20 parts 3-chloro-2-sulfopropionic acid, 20 parts water and about 26.5 parts 50% aqueous sodium hydroxide solution was added to the starch suspension. The resulting starch mixture was then agitated for 16 hours at 45° C. while controlling the pH at 11.4 by periodically adding 3% aqueous sodium hydroxide solution. At the end of the reaction, the mixture was cooled and the pH lowered to 6.0 with 10% aqueous hydrochloric acid solution. The starch product recovered thereby was purified by dialysis until a negative chloride test was obtained (about 36 hours) and then isolated by freeze drying. The resultant anionic starch ether derivative was found to contain 2.97% by weight of sulfur. (This amount corresponds to 15.5% 2-sulfo-2-carboxyethyl ether substituents.)

II. A starch ether derivative was prepared and purified in the identical manner as above except that the amount of 3-chloro-2-sulfopropionic acid was reduced to 3.0 parts and the reaction was conducted at 90° C. for two hours at a controlled pH of 11.2. The resultant starch product was found to contain 0.37% by weight of sulfur. (This amount corresponds to 1.9% 2-sulfo-2-carboxyethyl ether substituents.)

EXAMPLE VI

This example illustrates the method of this invention utilizing a non-aqueous solvent system.

I. A total of 25 parts corn starch, 2.5 parts sodium carbonate, and 2.5 parts dry neutralized 3-chloro-2-sulfopropionic acid reagent prepared as in Example IV were added to 100 parts ethanol. The resulting mixture was refluxed with agitation for 18 hours, cooled, and filtered. The starch product was purified by washing with water at pH 6.0 and then dried. The resulting starch ether derivative was found to contain 0.90% 2-sulfo-2-carboxyethyl ether substituents.

II. The above reaction was repeated in an identical manner except that ethanol was replaced by toluene. The resulting starch ether derivative was found to contain 0.71% 2-sulfo-2-carboxyethyl ether substituents.

III. The above reaction was repeated in an identical manner as part I except that ethanol was replaced by heptane. The resulting starch ether derivative was found to contain 0.92% 2-sulfo-2-carboxyethyl ether substituents.

EXAMPLE VII

This example illustrates the method of this invention utilizing a substantially dry reaction medium.

I. The anionic starch ether derivatives designated as Nos. 16–20 in Table III were prepared as follows.

To a slurry comprising 50.0 parts corn starch in 65.0 parts water was added 5.0 parts dry neutralized 3-chloro-2-sulfopropionic acid reagent prepared as in Example IV. The pH was adjusted to the desired value with 3% aqueous sodium hydroxide solution and the resulting starch isolated by filtration and then placed in an oven and heated at the given temperatures for the given reaction times. The starch product obtained thereby was cooled and then purified by resuspending in water, lowering the pH to 6.0 with 10.0% aqueous hydrochloric acid solution, filtering, washing with water, and drying. The resultant anionic starch ether derivatives were then analyzed and the results summarized in Table III.

TABLE III

| Derivative No. | Reaction pH | Reaction Temperature (° C.) | Reaction Time (hours) | % 2-Sulfo-2-carboxyethyl Ether Substituents |
|---|---|---|---|---|
| 16 | 11.0 | 40 | 5 | 0.60 |
| 17 | 11.4 | 40 | 5 | 0.55 |
| 18 | 10.5 | 150 | 2 | 0.50 |
| 19 | 11.4 | 150 | 2 | 0.56 |
| 20 | 11.4 | 70 | 2 | 0.91 |

II. To a slurry of 100 parts corn starch in 125 parts water were alternately added in small amounts 10 parts 3-chloro-2-sulfopropionic acid and 9.4 parts lime, while the pH was controlled at 10 -12 throughout the addition. When addition was complete, the slurry was stirred at pH 11.3 for several minutes, filtered, and the resulting treated starch heated at 70° C. in an oven for two hours. The starch product obtained thereby was cooled, and then purified by resuspending in 125 parts water, lowering the pH to 3.0 with 10% aqueous hydrochloric acid solution, filtering, washing with water, and drying. The resultant anionic starch ether derivative was found to contain 2.9% 2-sulfo-2-carboxyethyl ether substituents.

EXAMPLE VIII

This example illustrates the reversibility of the reaction of starch with neutralized 3-chloro-2-sulfopropionic acid reagent in aqueous medium at high temperatures.

A total of 200 parts corn starch was slurried in 250 parts water and 2.0 parts lime added thereto. Then 16.0 parts 3-chloro-2-sulfopropionic acid was slowly added while controlling the pH at 11.1–11.2 by periodically adding additional lime as required. After addition of 3-chloro-2-sulfopropionic acid reagent was complete and the pH constant, the resultant starch slurry was stirred at 23° C. and aliquots containing 40 parts starch were removed after 2, 4, 6, 7, and 24 hours. The pH of each aliquot was lowered to 3.0 with 9.5% aqueous hydrochloric acid and the starch product recovered by filtration, washed with water, and dried. The resultant starch ether derivative was analyzed for 2-sulfo-2-carboxyethyl ether content.

The above experiment was repeated in an identical manner except that the reaction temperature was increased from 23° C. to 40° C. All of the results are summarized in Table IV.

TABLE IV

| Derivative No. | Reaction Temperature (° C.) | Reaction Time (hours) | % 2-Sulfo-2-carboxyethyl Ether Substituents |
|---|---|---|---|
| 21 | 23 | 2 | 1.64 |
| 22 | 23 | 4 | 1.53 |
| 23 | 23 | 6 | 1.63 |
| 24 | 23 | 7 | 1.65 |
| 25 | 23 | 24 | 1.46 |
| 26 | 40 | 2 | 1.19 |
| 27 | 40 | 4 | 0.87 |
| 28 | 40 | 6 | 0.76 |
| 29 | 40 | 7 | 0.67 |
| 30 | 40 | 24 | 0.56 |

The above data indicate that the ether substituents are stable in aqueous alkaline medium at room temperature (23° C.) but are very slowly removed at 40° C.

EXAMPLE IX

This example illustrates the preparation of various anionic and amphoteric starch ether derivatives of this invention and the use thereof as pigment retention aids in the manufacture of paper containing pigment and alum.

Part I

Starch A: A total of 4.0 parts 3-chloro-2-sulfopropionic acid was slowly added to 64.5 parts water while controlling the pH at 11.0 with 20% aqueous sodium hydroxide solution. Then 1.5 parts sodium hydroxide and 15.0 parts sodium sulfate were added, followed by 50.0 parts corn starch. The resulting starch slurry was agitated at 44° C. for 16 hours. At the end of the reaction, the pH was lowered to 3.0 with 10% aqueous hydrochloric acid solution and the starch product recovered by filtration, washed with water, and dried.

Starch B: A total of 50.0 parts corn starch was slurried in 62.5 parts water and 2.5 parts 3-chloro-2-sulfopropionic acid slowly added thereto while controlling the pH with lime at 11.0–11.2. When reagent addition was complete and the pH constant, 1.1 parts additional lime and 2.0 parts of a 50% aqueous solution of diethylaminoethylchloride hydrochloride was added. The resultant mixture was agitated at 24° C. for 21 hours. At the end of the reaction period, the pH was adjusted to 3.0 with 9.5% aqueous hydrochloric acid solution and the starch product recovered by filtration, washed three times with water, and dried.

Starch C: A total of 100 parts corn starch was slurried in 125 parts water and 2.0 parts 3-chloro-2-sulfopropionic acid added thereto while simultaneously adding sufficient lime to maintain the pH at 11.2. (A total of 1.5 parts lime was required to maintain the pH.) When addition of the reagent was complete and the pH constant, 1.0 parts additional lime was added and the resulting slurry agitated at room temperature for 17 hours. The pH was then lowered to 3.0 with 10% aqueous hydrochloric acid solution and the starch product recovered by filtration, washed with water, and dried.

Starch D: A total of 100 parts corn starch was suspended in 125 parts water. Then 0.65 parts lime and 2.0 parts of a 50% aqueous solution of diethylaminoethylchloride hydrochloride was added thereto and the resulting mixture agitated at 40° C. for 16 hours. After this period 2.1 parts 3-chloro-2-sulfopropionic acid was slowly added while controlling the pH at 11.0–11.2 by periodically adding lime as required. The slurry was then stirred for 16 hours at room temperature. At the end of the reaction, the pH was adjusted to 3.0 with 10% aqueous hydrochloric acid solution and the starch product recovered by filtration, washed with water, and dried.

Part II

Each starch product prepared above was divided into three portions, and each portion was dispersed by cooking at atmospheric pressure in a conventional manner. Then the cooked portions were added at a concentration of 0.25%, based on the weight of the dry pulp, to a bleached sulfite pulp which contained a varied amount of paper alum, i.e., aluminum sulfate. The three pulps respectively contained 4.0, 11.0 and 15.0 percent, by weight, of alum, based on the dry pulp. In each case, the pigment retention value of the test paper stock and those of a control were determined by first preparing paper sheets on the Williams Standard Sheet Mold and then testing for the percent of titanium dioxide ($TiO_2$) retained by the method described in TAPPI, Standard # T413 m. 58. The control consisted of an amphoteric starch ether derivative of the prior art, i.e., the phosphorylated, diethylaminoethyl ether of corn starch, containing 0.32% nitrogen and 0.08% phosphorus by weight, prepared as described in U.S. Pat. No. 3,459,632. The results of the pigment retention determinations are summarized in Table V below.

TABLE V

| Material Starch Tested | amounts of alum.* Employed | % $TiO_2$ Retention in presence of the following | | |
|---|---|---|---|---|
| | | 4.0 | 11.0 | 15.0 |
| Test sample | A | 69.5 | 74.0 | 71.5 |
| " | B | 60.0 | 65.5 | 66.5 |
| " | C | 59.3 | 65.0 | 72.8 |
| " | D | 51.0 | 60.5 | 65.5 |
| Control | Phosphorylated, diethylaminoethyl starch ether | 69.0 | 58.0 | 52.0 |

*Based on the percent, by weight, of the dry pulp, yeilding pH values of 6.0, 4.6, and 4.0, respectively.

The above data clearly indicate the improved pigment retention obtained at high levels of alum by the use of the anionic and amphoteric starch ether derivatives of this invention.

Summarizing, this invention is seen to provide novel starch ether derivatives which may be used as pigment retention aids in paper and a method for the preparation thereof.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. As a composition of matter, a starch ether derivative of the general structure:

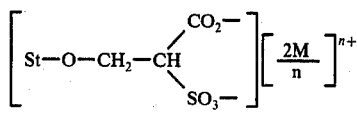

wherein St-O- represents a starch molecule, M is a cation, and $n$ is the valence number of M.

2. The starch derivative of claim 1 wherein M is an alkali or alkaline earth metal.

3. The starch derivative of claim 1 wherein the starch molecule contains cationogenic or cationic nitrogen-containing groups.

4. The starch derivative of claim 3 wherein the starch molecule contains either diethyl aminoethyl ether groups or 3-(trimethylammonium chloride)-2-hydroxypropyl ether groups.

5. A method for preparing a starch ether derivative of the general structure:

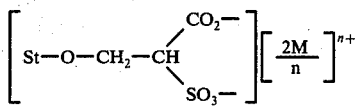

wherein St-O- represents a starch molecule, M is a cation, and $n$ is the valence number of M, which comprises the steps of:
 a. reacting a starch base with about 0.5–100% by weight of neutralized 3-chloro-2-sulfopropionic acid reagent, based on dry starch; and
 b. isolating the resultant starch derivative.

6. The method of claim 5 wherein said reaction is carried out in aqueous medium at a pH of 9.5–13.0 and at a temperature of 20°–90° C. for 0.5–24 hours.

7. The method of claim 6 wherein said reaction is carried out at a pH of 11–12 and at a temperature of 20°–30° C. for 1–6 hours.

8. The method of claim 6 wherein M is an alkali metal and said reaction is carried out in the presence of 15–50% by weight of sodium sulfate, based on dry starch.

9. The method of claim 5 wherein said reaction is carried out in a non-aqueous medium at a temperature of 40°–150° C. for 1–20 hours.

10. The method of claim 9 wherein said reaction is carried out in an organic solvent selected from the group consisting of alcohols, aromatic hydrocarbons and aliphatic hydrocarbons.

11. The method of claim 5 wherein said reaction is carried out in a substantially dry reaction medium at a temperature of 30°–150° C. for 0.5–10 hours.

12. The method of claim 5 wherein said 3-chloro-2-sulfopropionic acid reagent is neutralized prior to mixing with said starch.

13. The method of claim 5 wherein said 3-chloro-2-sulfopropionic acid reagent is neutralized in situ in the presence of said starch.

14. The method of claim 5 wherein said starch base is reacted with about 1–15% by weight of said neutralized 3-chloro-2-sulfopropionic acid reagent, based on dry starch, and the resultant starch ether derivative is granular.

15. The method of claim 5 wherein the starch molecule contains cationogenic or cationic nitrogen-containing groups.

16. The method of claim 15 wherein the starch molecule contains either diethyl aminoethyl ether groups or 3-(trimethylammonium chloride)-2-hydroxypropyl ether groups.

17. The method of claim 15 wherein the starch base is reacted with 2–6% by weight of the neutralized 3-chloro-2-sulfopropionic acid reagent and 0.5–2.5% by weight of cationic reagent, based on dry starch, the ratio of anionic to cationic reagent being about 2:1 to 4:1 by weight, wherein said cationic reagent provides said cationogenic or cationic nitrogen-containing groups and wherein the resultant starch ether derivative is granular.

18. The method of claim 5 wherein M is an alkali or alkaline earth metal.

19. A paper containing pigment and alum and having dispersed therein as a pigment retention aid a starch ether derivative of the general structure:

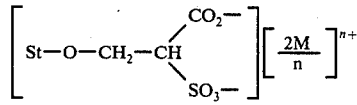

wherein St-O- represents a starch molecule, M is a cation, and $n$ is the valence number of M, wherein said paper is prepared from a papermaking stock containing more than 4% alum by weight of dry pulp and from about 0.05 to 2.0% of said starch derivative by weight of dry pulp.

20. The paper of claim 19 wherein the starch molecule of said starch ether derivative contains cationogenic or cationic nitrogen-containing groups.

21. The paper of claim 19 wherein M of said starch ether derivative is an alkali or alkaline earth metal.

22. In a method for making paper containing pigment and alum, the step which comprises adding, as a pigment retention aid, to the stock containing more than 4% alum by weight of dry pulp, at any stage prior to forming a web, a starch ether derivative of the general structure:

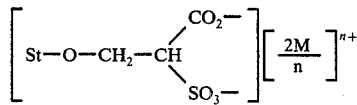

wherein St-O- represents a starch molecule, M is a cation, and $n$ is the valence number of M, said starch derivative being added to the stock in an amount of from about 0.05 to 2.0% by weight of dry pulp.

23. The method of claim 22 wherein the starch molecule of said starch ether derivative contains cationogenic or cationic nitrogen-containing groups.

24. The method of claim 22 wherein M of said starch ether derivative is an alkali or alkaline earth metal.

* * * * *